United States Patent [19]
Lee

[11] 3,749,351
[45] July 31, 1973

[54] BULLET MOLD WITH PIVOTALLY MOUNTED CENTRAL MOLD PORTION
[76] Inventor: Richard J. Lee, R. R. 2, Hartford, Wis. 53027
[22] Filed: Dec. 29, 1971
[21] Appl. No.: 213,635

Related U.S. Application Data
[63] Continuation-in-part of Ser. No. 168,569, Aug. 3, 1971.

[52] U.S. Cl. ............................................. 249/170
[51] Int. Cl. .......................................... B41b 11/54
[58] Field of Search .................... 249/161, 165, 102, 249/108, 166, 167, 168, 170, 171, 173; 164/264

[56] References Cited
UNITED STATES PATENTS

| 936,475 | 10/1909 | Putney | 249/171 X |
|---|---|---|---|
| 170,975 | 12/1875 | Wetmore | 249/171 X |
| 904,273 | 11/1908 | Mundt | 249/161 X |
| 354,422 | 12/1886 | Jewett | 249/170 X |
| 705,146 | 7/1902 | Richter | 249/170 |
| 1,083,841 | 1/1914 | Leblanc | 249/171 X |
| 1,184,937 | 5/1916 | Fargo | 249/102 X |
| 1,431,164 | 10/1922 | Kukac | 249/170 |
| 1,544,778 | 7/1925 | Schultz | 249/170 X |
| 1,608,333 | 11/1926 | Millican | 249/170 X |
| 1,763,977 | 6/1930 | McNeely | 249/161 X |

Primary Examiner—J. Spencer Overholser
Assistant Examiner—John S. Brown
Attorney—Andrus, Sceales, Starke & Sawall

[57] ABSTRACT

A pair of outer mold portions are mounted for relative arcuate pivoting movement, about a pivot center, into and out of closed molding position. The outer mold portions are provided with female cavity portions. An inner mold portion is disposed between the outer mold portions and mounted for arcuate pivoting movement about the same pivot center. In one embodiment, as where hollow bullet portions are desired, the inner mold portion comprises a male core which cooperates with the said female cavity portions. In another embodiment, the inner mold portion comprises a member providing a pair of female cavity portions which register with the cavity portions in the outer mold portions to provide casting of two bullets at one time. In both embodiments, two or more bullets can be cast by using appropriate multi-cavity structures. In all embodiments, a Z-shaped holder for the inner mold portion has a web with end edges which automatically engage the side walls of the respective outer mold portions to provide an automatic stop for centering the inner mold portion when the mold is opened.

3 Claims, 9 Drawing Figures

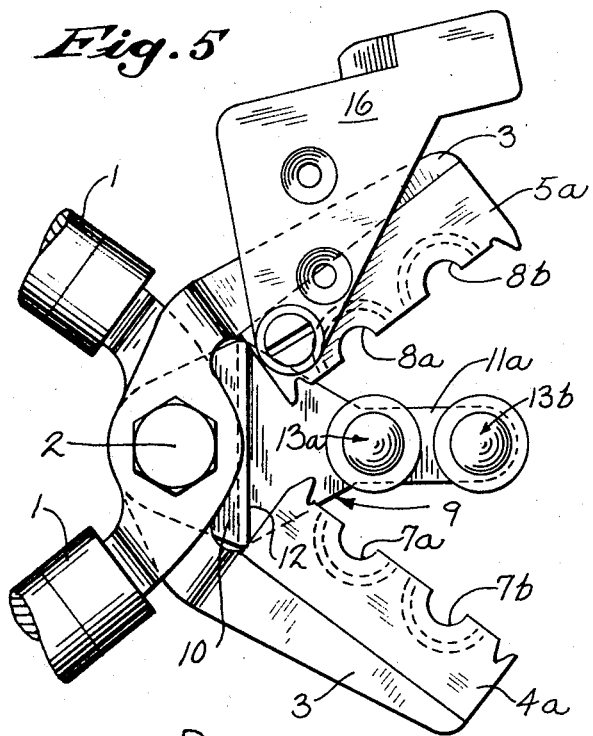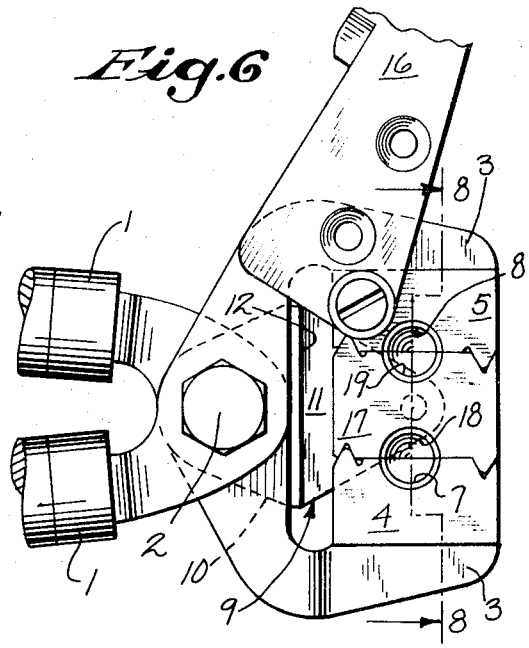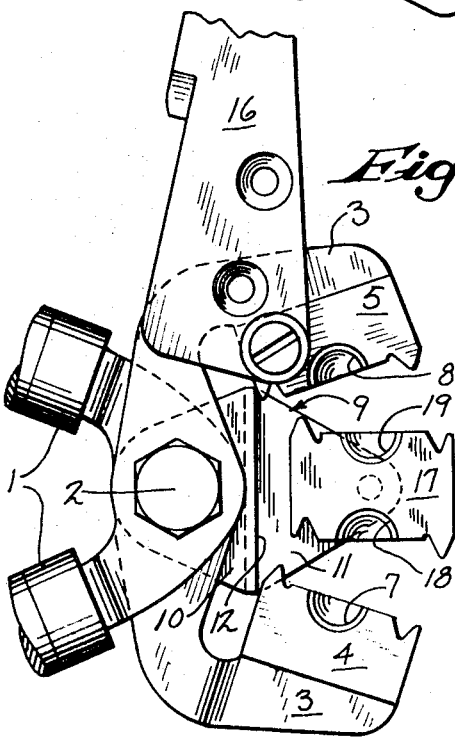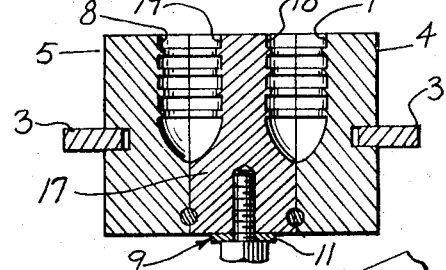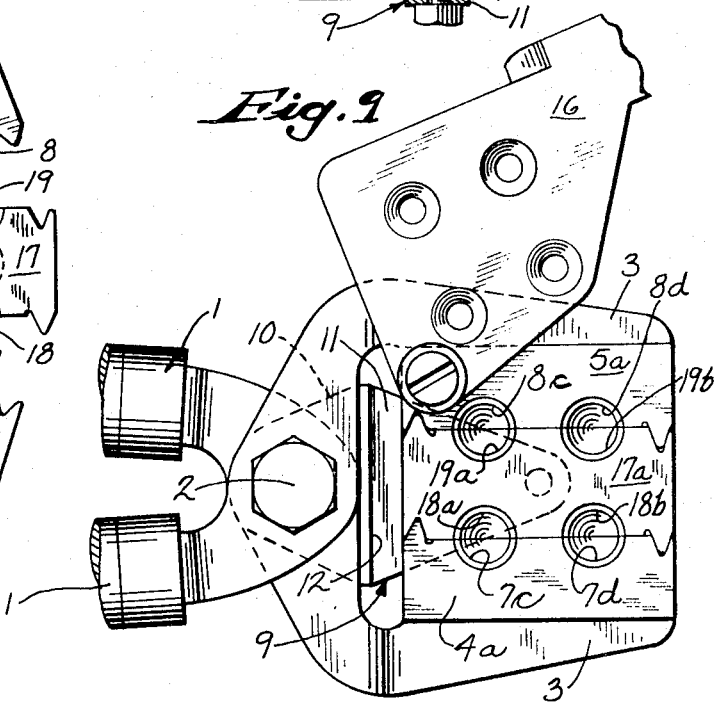

BULLET MOLD WITH PIVOTALLY MOUNTED CENTRAL MOLD PORTION

BACKGROUND AND SUMMARY OF THE INVENTION

This application is a continuation-in-part of my co-pending application Ser. No. 168,569, filed Aug. 3, 1971 and entitled "Bullet Mold."

This invention relates to a bullet mold having a pivotally mounted central mold portion.

In hand casting of bullets utilizing a pair of pivotally mounted mold portions, it is sometimes desirable to cast bullets which have a hollow base or point. It is also sometimes desirable to increase the number of bullets cast at one time. Previous attempts to accomplish these objectives have led to the use of separate tools and/or complicated apparatus, which was undesirable.

In accordance with the present invention, a pair of outer mold portions are mounted for relative arcuate pivoting movement, about a pivot center, into and out of closed molding position. The outer mold portions are provided with female cavity portions. An inner mold portion is disposed between the outer mold portions and mounted for arcuate pivoting movement about the same pivot center. In one embodiment, as where hollow bullet portions are desired, the inner mold portion comprises a male core which cooperates with the said female cavity portions. In another embodiment, the inner mold portion comprises a member providing a pair of female cavity portions which register with the cavity portions in the outer mold portions to provide casting of two bullets at one time. In both embodiments, two or more bullets can be cast by using appropriate multi-cavity structures. In all embodiments, a Z-shaped holder for the inner mold portion has a web with end edges which automatically engage the side walls of the respective outer mold portions to provide an automatic stop for centering the inner mold portion when the mold is opened.

DESCRIPTION OF THE DRAWINGS

The accompanying drawings illustrate the best mode presently contemplated by the inventor for carrying out the invention.

In the drawings:

FIG. 5 is a top plan view of a second embodiment of the bullet mold, with the mold open;

FIG. 6 is a top plan view of a third embodiment of the bullet mold, with the mold closed;

FIG. 7 is a view similar to FIG. 6, with the mold open;

FIG. 8 is a vertical transverse section taken on line 8—8 of FIG. 6; and

FIG. 9 is a top plan view of a fourth embodiment of the bullet mold, with the mold closed.

DESCRIPTION OF THE PREFERRED EMBODIMENTS

Figure 1:
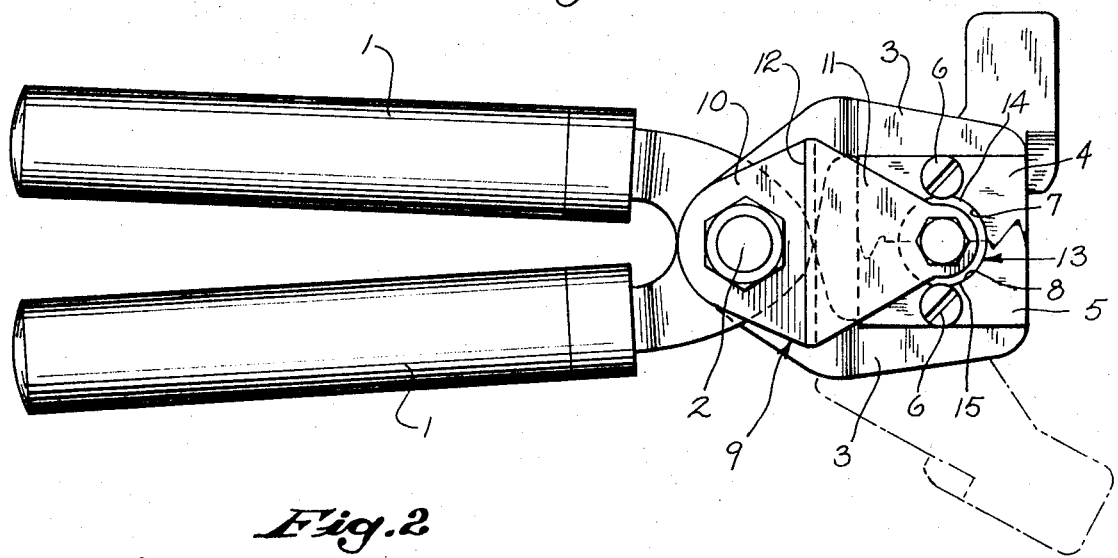
FIG. 1 is a bottom plan view of a first embodiment of the bullet mold, showing the mold closed.

As shown in FIGS. 1–4 of the drawings, the hand bullet mold of the invention comprises a scissor-like clamping handle 1 pivoted at pivot center 2 and having a pair of clamp arms 3. Arms 3 pivot about center 2 on the other side thereof from handle 1, and are adapted to centrally hold a pair of complimentary opposed outer mold portions 4, 5 for pivoting movement, about center 2, into and out of molding position.

Mold portions 4, 5 are centrally secured to arms 3, as by screws 6, and may be constructed similarly to those disclosed in my aforementioned co-pending application Ser. No. 168,569. The inner face of each outer bullet mold portion 4, 5 is provided with a longitudinal semi-circular female cavity portion 7, 8 which cooperates with the opposite portion to form one or more complete cavities when the mold is closed.

In accordance with the invention, an inner mold portion is loosely mounted for pivotal movement about pivot center 2 and is adapted to cooperate with outer mold portions 4, 5 to define at least one mold cavity. For this purpose, a mold holder 9 of generally Z-shaped section is provided which includes outer and inner generally planular flanges 10, 11 joined by a perpendicular web 12. Holder 9 is disposed at the bottom of the mold, with flange 10 mounted to pivot center 2 and flange 11 extending to at least proximate, and as herein shown, beneath and between outer mold portions 4, 5. Holder 9 is narrower at all points than clamp arms 3, whether the latter are closed or open, so that there are no protrusions for spilled molten metal to fall onto.

Figure 2:
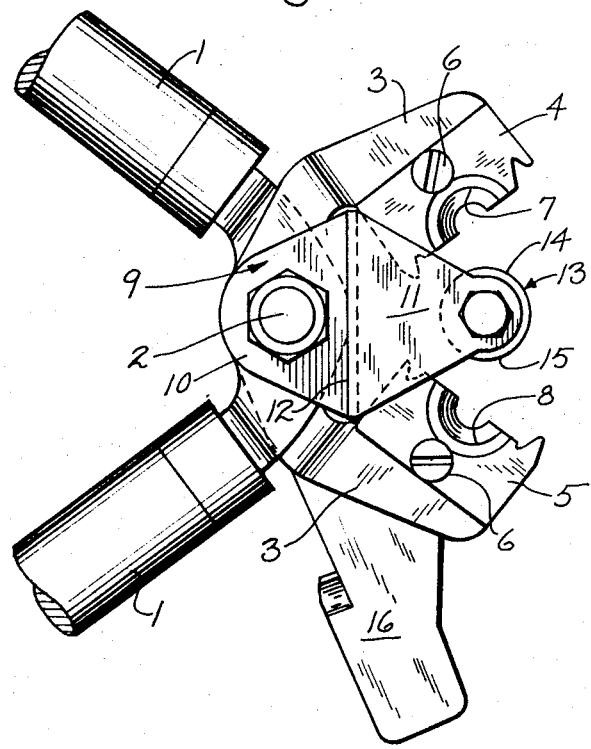
FIG. 2 is a view similar to FIG. 1 with the mold open.
Figure 4:
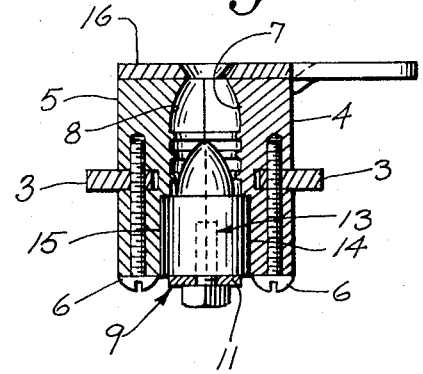
FIG. 4 is a vertical transverse section taken on line 4—4 of FIG. 3.
Figure 3:
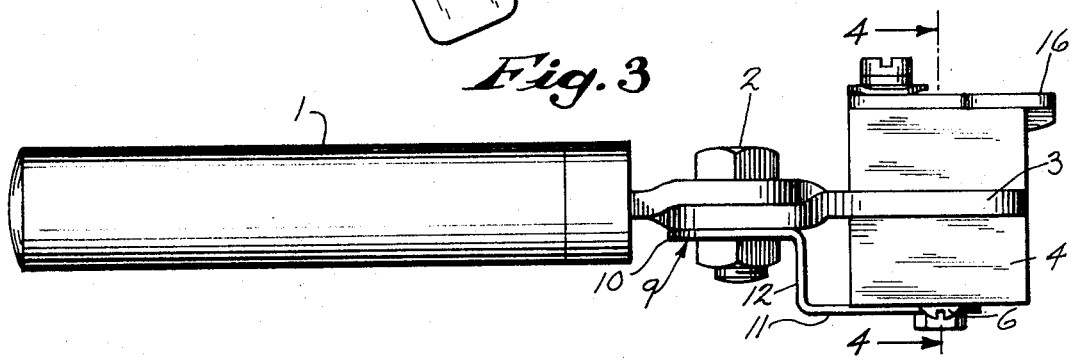
FIG. 3 is a side view of the closed mold.

In the embodiment of FIGS. 1–4, holder 9 provides a supporting mount for an inner mold portion 13 which is constructed and disposed to cooperate with outer mold portions 4, 5 for casting of bullets with hollow portions. For this purpose, cavities 7, 8 extend through the bottoms of outer mold portions 4, 5 and mold portion 13 comprises a core pin which extends upwardly from flange 11 into the mold. Mold portion 13 includes a pair of outwardly facing semi-circular male surface portions 14, 15 which, when the mold is closed, as in FIG. 4, spacingly register with the respective female cavity portions 7, 8 to provide a hollow bullet portion when suitable molten metal is poured into the cavity through an upper sprue plate 16. Portions 7, 8, 14 and 15 are all on an arc of the same radius which bisects them. When the mold is opened, outer mold portions 4, 5 will move away from inner mold portion 13, with a lost motion action, a distance sufficient to permit the bullet to drop out. When the mold is wide open, as shown in FIG. 2, mold portion 13 will be automatically centered between mold portions 4, 5. As best shown in FIG. 2, the automatic centering is provided by engagement of both end edges of web 12 with the outer side walls of the respective outer mold portions 4 and 5, thereby forming cooperative stop means. See also FIG. 3.

FIG. 5 shows an embodiment wherein multiple bullets with hollow portions may be molded. For this purpose, outer mold portions 4a, 5a include two sets of female cavity portions 7a and b, 8a and b. In addition, flange 11a is elongated and mounts two spaced inner mold portions 13a and b. The function is substantially the same as in the first embodiment.

In the embodiment of FIGS. 6–8, holder 9 provides a supporting mount for an inner mold portion 17 which is constructed and disposed to cooperate with outer mold portions 4, 5 for casting of multiple solid bullets. For this purpose, mold portion 17 is similar to portions 4, 5 and is provided with a pair of outwardly facing female cavity portions 18, 19 which, when the mold is closed, register with respective cavity portions 7, 8 to form a pair of complete mold cavities.

Once again, additional complete cavities may be formed. As shown in the embodiment of FIG. 9, block 17a may include a pair of female cavities on each face, as per 18a and b, 19a and b, and which register with multiple cavities 7c and d, 8c and d in outer mold portions 4a and 5a.

In the embodiments of FIGS. 6–9, the cavities of the outer and inner mold portions terminate above the bottom of the mold. Furthermore, and in the embodiments of FIGS. 6–9 especially, holder 9 and inner mold portion 17 may be a unitary integral piece.

In addition, in all embodiments, all mold portions move on an arc of a radius whose center is pivot center 2, when the mold is opened and closed, and the above-described cooperative stop means are utilized.

Various modes of carrying out the invention are contemplated as being within the scope of the following claims particularly pointing out and distinctly claiming the subject matter which is regarded as the invention.

I claim:

1. In a bullet mold:
   a. a device having handle means and clamping members joined for arcuately pivoting about a pivot center,
   b. a pair of complimentary opposed outer mold portions mounted to said clamping members and movable thereby between open and molding positions,
   c. each of said outer mold portions having outer side walls and a longitudinally extending semi-circular inwardly facing female cavity portion,
   d. holder means pivotally mounted at said pivot center and extending to at least proximate said outer mold portions, said holder means comprising:
      1. a member generally Z-shaped in section and including inner and outer flanges joined by a web having end edges,
      2. said outer flange being mounted to said pivot center and said inner flange extending beneath said outer mold portions,
   e. an inner mold portion on said holder means for cooperating with said outer mold portions when the mold is closed to define at least one mold cavity,
   f. said outer and inner mold portions all being mounted to move on an arc of a radius whose center is said pivot center when the mold is opened and closed,
   g. and stop means formed by cooperative engagement of both end edges of said web and the outer side walls of said respective outer mold portions when the mold is open to automatically center said inner mold portion between said outer mold portions.

2. The mold of claim 1: wherein said inner mold portion includes a pair of outwardly facing female cavity portions which, when the mold is closed, register respectively with said first-named female cavity portions on said outer mold portions to form a pair of complete mold cavities.

3. The mold of claim 2:
   a. wherein each outer mold portion includes a plurality of inwardly facing female cavity portions,
   b. and wherein each face of said inner mold portion includes a plurality of outwardly facing female cavity portions.

* * * * *